July 2, 1946.  S. M. NAMPA  2,403,014
AIR OPERATED AUTO-STOP
Original Filed Aug. 2, 1940   5 Sheets-Sheet 1

July 2, 1946. S. M. NAMPA 2,403,014
AIR OPERATED AUTO-STOP
Original Filed Aug. 2, 1940 5 Sheets-Sheet 2

INVENTOR.
Sulo M. Nampa.
BY Harness, Dickey & Pierce.
ATTORNEYS.

July 2, 1946.    S. M. NAMPA    2,403,014
AIR OPERATED AUTO-STOP
Original Filed Aug. 2, 1940    5 Sheets-Sheet 3

INVENTOR.
Sulo M. Nampa.
BY
Harness, Dickey & Pierce.
ATTORNEYS.

Patented July 2, 1946

2,403,014

UNITED STATES PATENT OFFICE 2,403,014

AIR OPERATED AUTO STOP

Sulo M. Nampa, Detroit, Mich., assignor to Grade Crossing Guard Corporation, Memphis, Tenn., a corporation of Tennessee Original application August 2, 1940, Serial No. 349,886. Divided and this application October 12, 1942, Serial No. 461,684

10 Claims. (Cl. 39—6)

The present invention relates to crossing protective apparatus of the guard or barrier type, particularly designed for use at roadway intersections, such as at rail-highway crossings, street intersections, bridge entrances, and the like.

The present application is a division of applicant's copending application Serial No. 349,886, filed August 2, 1940, now Patent No. 2,327,366, granted August 24, 1943, and assigned to the assignee hereof.

The principal objects of the present invention are to provide an improved and simplified apparatus of the above character, which embodies relatively few operating and moving parts, which is sufficiently strong to withstand heavy vehicle impacts and is, nevertheless, so constructed as to require relatively simple and light mounting and power means; to provide such apparatus, which is dependable and positive in its action, which is relatively simple and inexpensive to manufacture and install, and which requires relatively simple and infrequent maintenance service; and to provide such apparatus which minimizes injuries to vehicles which strike the barrier surface and which facilitates the relatively free passage of vehicles out of the space between the barriers at the respectively opposite sides of the intersections.

Further objects of the present invention are to provide apparatus of the above character, in which the barrier can relatively readily be released from certain of the operating members, so as to enable the barrier to be elevated to a position higher than the projected position thereof, whereby to afford ready access to the interior of the barrier casing for inspection and maintenance purposes; to provide such a construction embodying improved hinging arrangements of simplified construction which efficiently withstand the aforesaid impact shocks and which are particularly adapted for the above abnormal or pull-away movements of the barrier; to provide such a construction wherein the barrier face is provided with a series of openings having removable covers to afford access to the interior of the barrier, whereby to enable the disconnection of the barrier from the said operating members; to provide such a construction embodying improved lighting units carried by the barrier for projecting beams of light from the barirer face, and which lighting units are swingable for purposes of repair and inspection and to afford access to the interior of the barrier for the purposes of the above-mentioned service disconnections; to provide such constructions embodying a relatively simple and readily erected casing structure; and to provide such constructions wherein the barrier casing is embedded in a concrete or equivalent body, which is insulated from adjacent pavement panels so that impact shocks directed against the barrier are not transmitted to such adjacent panels and embodying improved sealing means between the casing and the barrier; to provide such constructions embodying improved means for ventilating and draining the pit and casing structures.

With the above as well as other objects in view, which appear in the following description and in the appended claims, preferred but illustrative embodiments of the present invention are shown in the accompanying drawings, throughout the several views of which corresponding reference characters are used to designate corresponding parts, and in which:

Fig. 8 is an enlarged detail view of a releasable connection;

It will be appreciated from a complete understanding of the present invention that, in a generic sense, the improvements thereof may be embodied in protective systems of widely varying construction and arrangement and specifically adapted for widely differing purposes. The specific embodiments of the invention herein illustrated represent preferred constructions. As previously mentioned, the present invention is frequently applied to rail highway crossings and by way of illustration, the invention is so illustrated in the present application.

Figure 1:
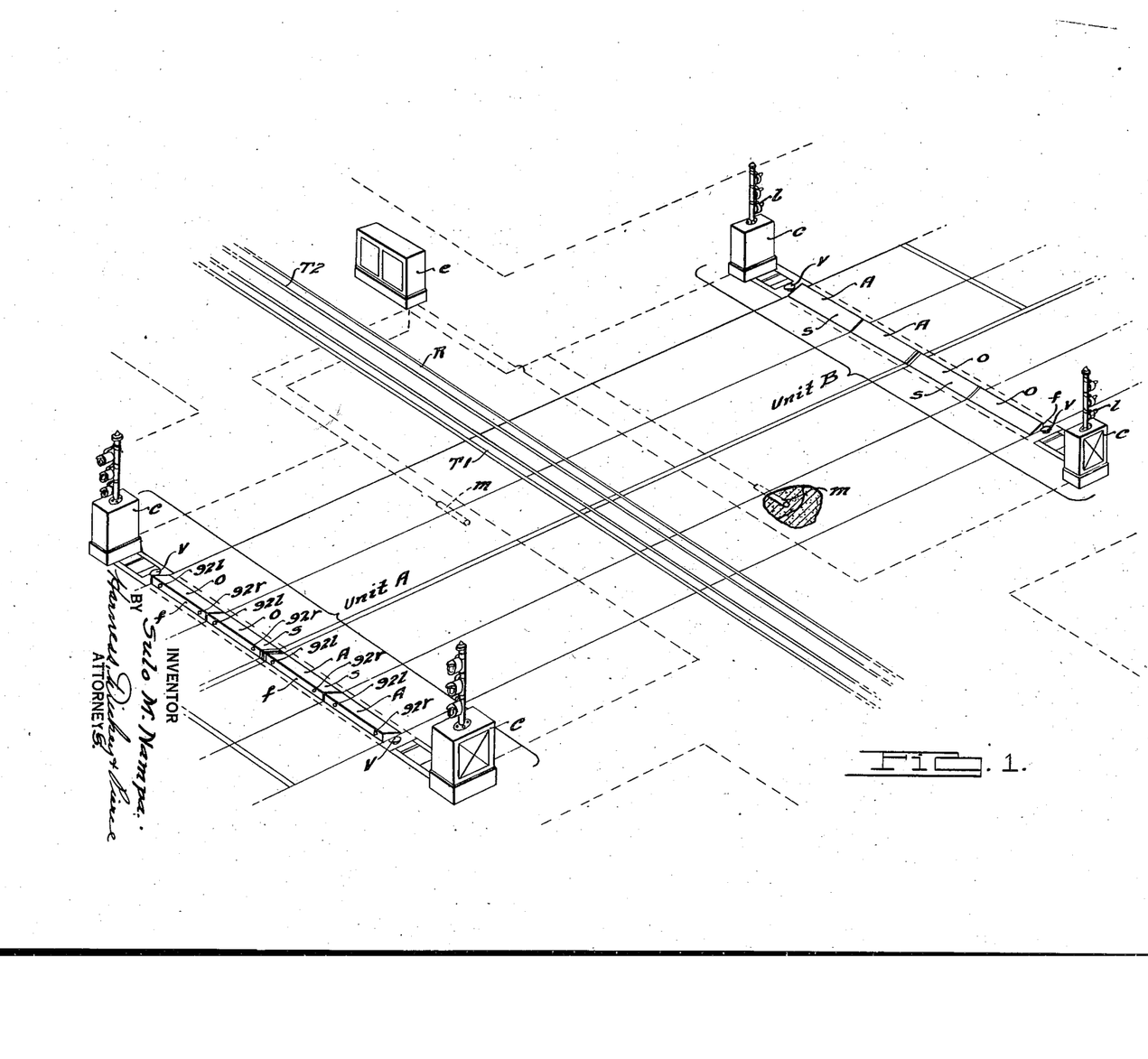
Figure 1 is a perspective view of a typical rail highway installation, embodying the invention.
Figure 2:
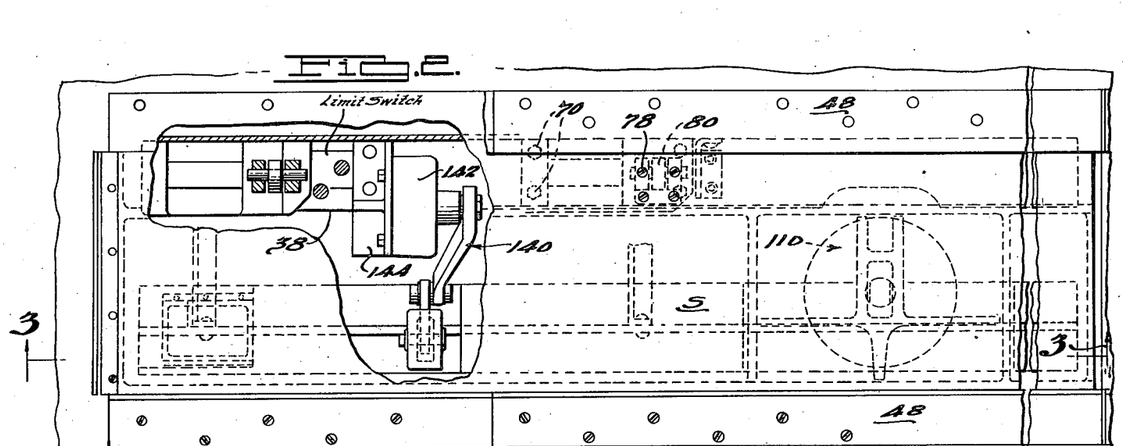
Fig. 2 is a view in top plan, with certain of the parts broken away, of one of the barrier units shown in Fig. 1.

Referring particularly to Fig. 1, a typical installation for an intersection between a railway and a four-lane highway is shown. In this figure, two barriers are individual to each traffic lane, one barrier of each pair being positioned at the approach side of the railway R and the other barrier of each pair being positioned at the off-going side of the railway. The two approach barriers at each side of the intersection are designated A and the two off-going barriers at each side of the intersection are designated O, it being understood that all of the barriers A and O are preferably of duplicate construction. All of the barriers A and O are embedded in the roadway and normally occupy positions in which the upper surfaces, such as $s$ thereof, lie substantially flush with and thus constitute continuations of the roadway surface. The mountings for the barriers within their associated casings are pivotal, and under the conditions described in said Patent 2,327,366, the barriers are automatically actuated so as to swing them from the just-mentioned retracted positions to the illustrated projected positions in which the faces $f$ thereof project above the roadway surfaces and constitute obstructions or barrier surfaces for engagement by vehicles approaching the barriers. The barrier faces are preferably formed and dimensioned in accordance with the arrangement disclosed and claimed in Evans Patent No. 2,075,892, granted April 6, 1937, and assigned to the assignee of the present application. The Evans arrangement, briefly, is one wherein the height and form of the barrier faces are such that vehicles striking the barrier faces apply forces which tend to retract the barriers to the retracted positions, the reaction between each barrier and the vehicle, however, being such as to avoid injury to the vehicle occupants.

The operating cycles for the two approach barriers A at each side of the intersection are identical, and while in the broader aspects of the invention such two barriers may be combined into a single unit or may be subdivided into a larger member, the illustrated arrangement employs one such barrier individual to each lane. Both approach barriers at each side of the intersection may have a common source of power, certain of the control apparatus wherefor is housed within an associated cabinet $c$, located in line with, but to one side of the associated barriers. Similar comments apply to the two off-going barriers O at each side of the intersection, which are provided with a common source of power, certain of the elements wherefor may be housed within similar cabinets $c$.

As hereinafter described, the barrier faces $f$ are preferably provided with light sources and with reflecting devices, and in addition, to afford predetermined warnings as to the condition of the intersection, it is preferred to provide usual traffic lights, which may be carried upon standards $l$ mounted upon the cabinets $c$.

In rail highway installations, it is preferred to have the barriers automatically respond to the approach of trains to the intersection, and the electrical control system for effecting this response may be housed in an additional cabinet $e$ positioned at one side of the intersection. The conduit system extending between the cabinet $e$, the individual cabinets $c$, and the individual barriers is indicated generally by the dotted lines in Fig. 1. Fig. 1 also diagrammatically shows certain vehicle operated barrier control elements $m$, which are embedded in the roadway.

Referring now more particularly to Figs. 2 through 12, the details of construction of the individual barriers and the casings therefor are shown in detail, it being appreciated, as previously mentioned, that constructions of the barriers and the casings for both the approach and off-going lines are the same. Each barrier is of elongated form, generally triangular in cross-section, having the previously mentioned surface, such as $s$, and the previously mentioned face $f$. The ends of each barrier are closed by end plates 30. Each barrier may be and preferably is formed as a casting, and the interior thereof is provided with reinforcing members, such as the intermediate plates 32 and the longitudinal ribs 34.

Each barrier casing is preferably built up of standard structural sections, comprising the two longitudinally extending laterally spaced members 36 and 38. The members 36 and 38 are received within a reinforced concrete or equivalent pit 40, which pit 40, in turn, is insulated from the adjacent pavement panels 42 by means of the usual highway expansion joints 44, which joints have the effect, as will be understood, of preventing the impact shocks to which the barriers are subjected, from being transmitted to and damaging the adjacent pavement panels 42. The front and rear structural sections, such as 36 and 38, one of each of which is preferably provided for each pair of barriers, are maintained in spaced relation to each other by a plurality of longitudinally distributed connecting members, such as the plate 58, shown in Fig. 6, and it will be appreciated, therefore, that the entire casing and pit structure can be economically manufactured and installed.

Figures 9, 10, 11, 12:
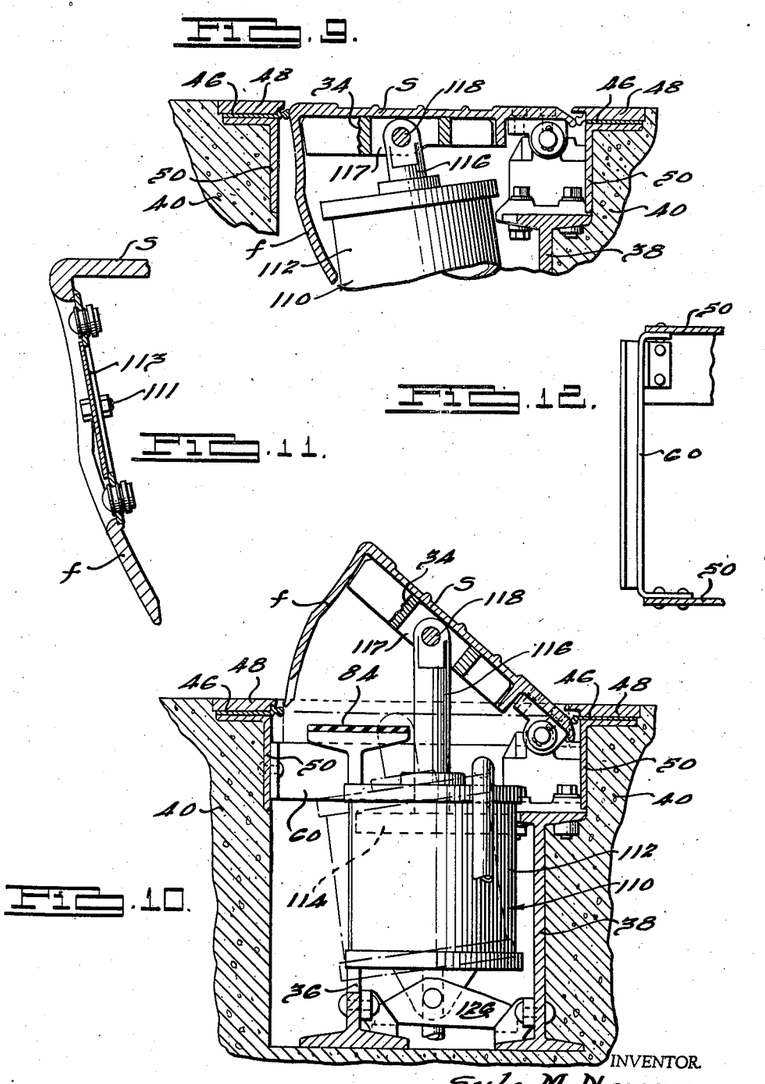
Fig. 9 is a fragmentary view, taken along the line 9—9 of Fig. 3.
Fig. 10 is a view in vertical transverse section, corresponding generally to Fig. 9, but showing the associated barrier in the projected position.
Fig. 11 is a fragmentary view in section, taken along the line 11—11 of Fig. 4.
Fig. 12 is a fragmentary plan view, showing a detail of construction of the barrier casing.

When the barriers are in their normal or retracted positions, it is preferred to provide a continuous seal between each barrier and its associated casing or pit, and for this purpose, rubber or other resilient sealing strips 46 (Fig. 6) are secured at respectively opposite sides of the pit, between the sill members 48 and 50, which latter members, in turn, are supported by the concrete panel 40, and are maintained in assembled relation to each other by end connections, comprising the reinforcing bars 60 (Fig. 12). Similar sealing strips 52 (Fig. 3) are secured to that end of each barrier which is adjacent the end of the associated pit. In order to form a seal between the adjacent ends of two immediately adjacent individual barriers, such as the two approach barriers at either side of the intersection, one of such barriers is provided with a sealing strip 54 (Fig. 3) which engages a bead, such as 56, which projects from the end of the immediately adjacent barrier. The rubber sealing strips do not interfere with the relatively free movements of the barriers between the projected and retracted positions, but form a sufficiently tight joint between the individual barriers and between the barriers and the casings to largely prevent the entrance of water or dirt into the barrier pits. Such pits are, of course, preferably provided with drainage means and such pits are also preferably ventilated. For the latter purpose, vents, such as $v$ (Fig. 1) are provided each side of the intersection, which vents communicate, as will be understood, with the interiors of the casings for the associated pairs of barriers.

Each barrier is pivotally supported within its associated casing by means of a plurality of pairs of main hinges 62 and a corresponding plurality of auxiliary hinges 64. As shown, four pairs of main and auxiliary hinges are employed. Each main hinge comprises a relatively heavy hinge pin 66, which may be and preferably is cast integral with the associated supporting bracket 68, which bracket, in turn, is secured to the inner surface of the associated barrier as by a plurality of studs 70. Under normal operating conditions, each pin 66 is received in a semi-cylindrical seat 72 provided in a block 74, which block 74, in turn, is removably secured to the casing section 38.

Each auxiliary hinge comprises a clevis 76, which is removably secured to the inner surface of the associated barrier by a plurality of studs, such as 78, and an eye 80, which is secured to the associated bracket 75. Each clevis 76 and its associated eye 80 are pivotally but loosely connected together by a pin 82.

It will be appreciated that the auxiliary hinges function primarily to positively prevent the associated barrier from being displaced from its casing. By virtue of the relatively loose fit between the elements of each auxiliary hinge, however, all loads supplied to the barrier are transmitted to the casing directly through the main hinge pins 66 and the blocks 74. Consequently, the auxiliary hinges can be of relatively light construction.

Figure 3:
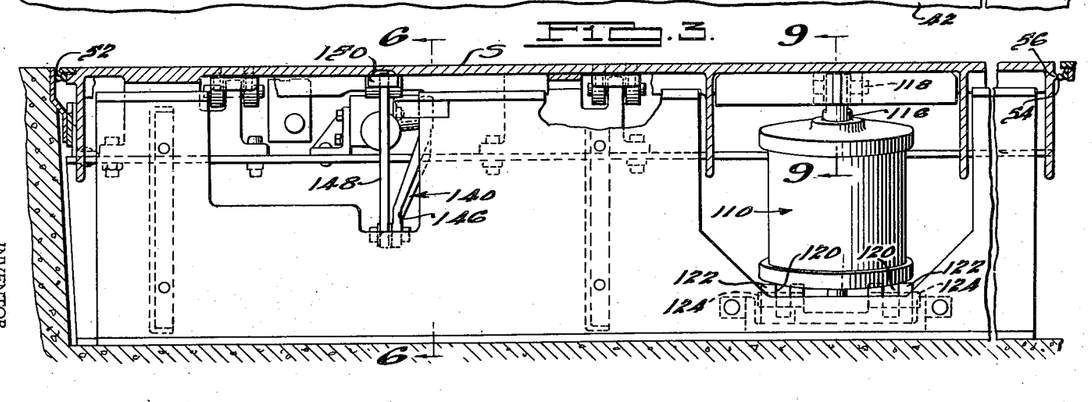
Fig. 3 is a view in vertical longitudinal section, taken along the line 3—3 of Fig. 2.

When each barrier is in its normal or retracted position, shown in Figs. 3 and 9, the forward ones of the previously mentioned longitudinal stiffening ribs 34 rest upon the forward casing sections 36. In order to silence the retracting movements of each barrier, as well as to give some resilience to the barrier mounting, the just-mentioned casing section 36 is preferably provided with pads such as 84 (Fig. 10), formed of rubber or other resilient material, upon which the barrier rests when retracted.

Figures 4, 5:
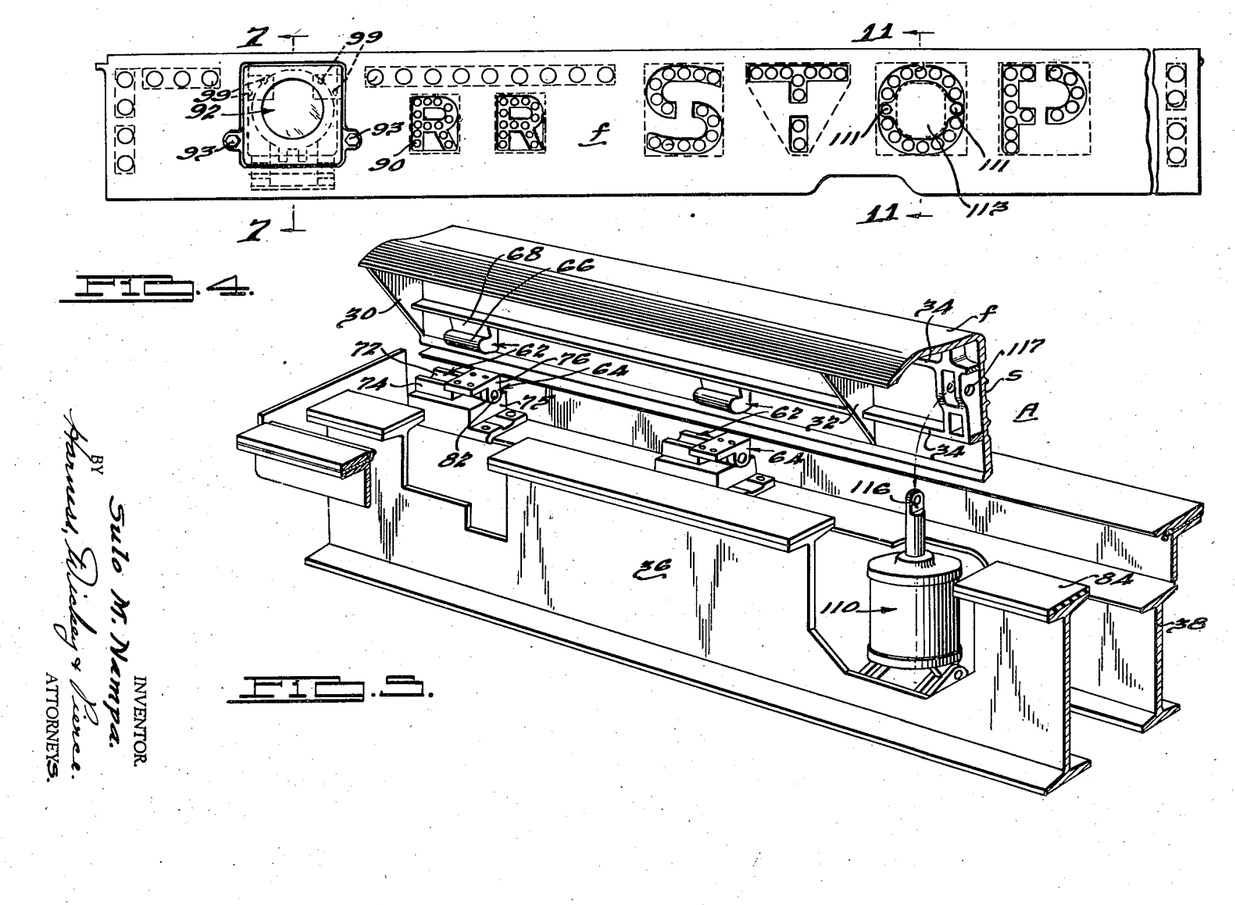
Fig. 4 is a view in front elevation of a barrier face.
Fig. 5 is a perspective view showing a barrier in the pull-away or service position.
Figure 5:
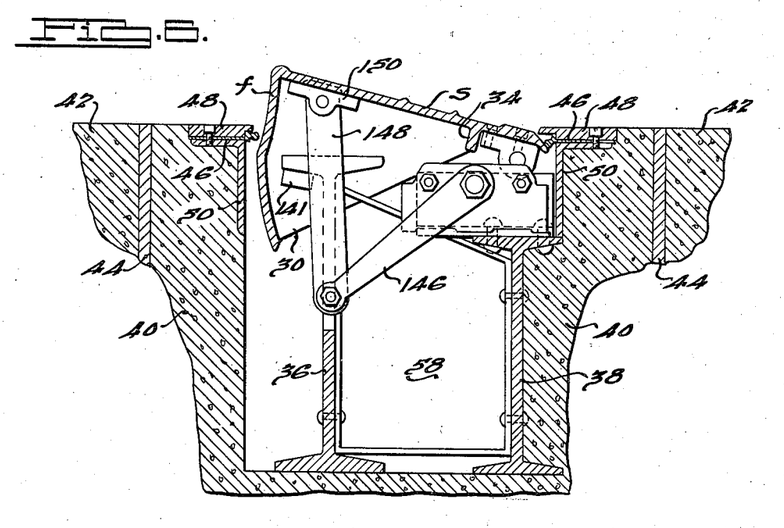
Figures 6, 7:
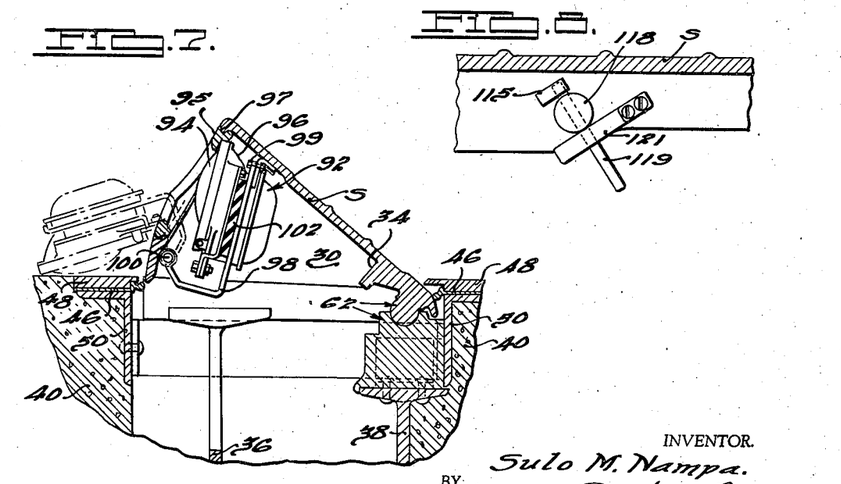
Fig. 6 is a view in vertical transverse section, taken along the line 6—6 of Fig. 3.
Fig. 7 is a view in vertical transverse section, taken along the line 7—7 of Fig. 4, but showing the barrier in the elevated position.

Referring particularly to Fig. 4, the forward face of each barrier is preferably provided with lettering, which may be outlined by usual bulls-eyes 90, which reflect the light directed against the barrier faces by on-coming vehicles to give suitable warning. Also, each barrier face is preferably provided, adjacent either end thereof, with a lighting fixture designated as a whole in Figs. 4 and 7 by the reference character 92. In Fig. 1, the lights are diagrammatically shown, those at the left ends of the barrier being designated 92—l and those at the right hand ends being designated 92—r. Each lighting fixture comprises generally a lens 94 and an enclosing reflector shell 96, which are mounted upon a bracket 98. The bracket 98, in turn, is pivotally connected to the inner surface of the barrier face by means of a pin 100. In order to protect the lamp associated with each lighting unit from the effect of impacts against the barrier, a rubber block 102 or other resilient element is preferably interposed between each shell 96 and bracket 98. The bracket 98 is releasably connected to the barrier by means of studs 99, so that under normal operating conditions, it is rigid with respect to the barrier.

Each barrier face f is provided with a generally rectangular opening 97 (Fig. 7), which is large enough to accommodate the swinging movement of the associated lighting unit 92 from the full line position to the dotted line position. In order to protect each light unit, each such opening 97 is provided with a removable molding 95, having a circular opening in the face thereof, which molding is removably held in place by studs 93.

It will be appreciated, therefore, that if it is desired to inspect or repair one of the lighting units 92, or if it is desired to obtain access to the interior of the barrier for the hereinafter described pull-away operation, the studs 93 may be loosened, after which the moldings 95 may be removed. Upon removal of the moldings 95, the previously mentioned studs 99 are accessible and by removing these studs, the corresponding light unit may be bodily swung to the dotted line position in Fig. 7.

In accordance with the present invention, the motive means for elevating each barrier from its retracted position to the projected position comprises a single fluid pressure operated ram individual to each barrier, and a feature of particular importance resides in the use of an elastic fluid, such as air, as the actuating means for each ram.

Each ram, designated as a whole as 110, is illustrated as being of single acting construction, having a cylinder 112, which slidably receives a piston 114, which piston, in turn, is provided with a piston rod 116. The end of each piston rod is connected to a clevis 117, integral with the associated barrier, by a pin 118. The lower end of each ram cylinder 112 is provided with a pair of spaced eyelets 120, which are connected to transversely spaced clevises 122 by means of pins 124. The clevises 122 are rigidly secured to and may be formed integrally with a transverse bracket 126, which extends between and is rigidly connected to the front and rear casing sections 36 and 38. With this relation, each ram can have pivotal movement relative to the associated barrier casing and also relative to the associated barrier, and it will be understood that upon the introduction of the actuating fluid into the cylinder space beneath the ram piston, the piston is forced upwardly and consequently swings the associated barrier from the retracted position of Fig. 9 toward the fully projected position of Fig. 10. Upon the release of such fluid pressure, in turn, the corresponding barrier returns by gravity to the retracted position.

As described in the aforesaid Patent 2,327,366, each ram is provided with an inlet connection which opens into the space beneath the associated piston and is also provided with an unobstructed exhaust connection, which communicates directly with the cylinder space at the upper side of the piston. With such an arrangement, the individual rams 110 are not effective to impose a limit upon the rate of upward rise of the associated barrier, and it is, therefore, preferred to provide the barrier with snubbers or shock absorbers, which, while not interfering in any way with the rate at which the barriers may be depressed, are effective to limit the rates at which the barriers rise. In the present instance, each barrier is provided with two such shock absorbers 140, which are symmetrically arranged adjacent the respectively opposite ends of the barrier. Each shock absorber 140, which may be of conventional construction, comprises a main body 142, which is rigidly connected by a bracket 144 to the associated casing section 38. Each shock absorber also comprises an articulated arm, having the links 146 and 148 connected, respectively, to the moving element within the shock absorber body and to the barrier. In the present instance, also, the shock absorbers 140 are arranged to form positive limit stops to the projecting movements of the barriers and for this purpose, the forward casing section 36 of each barrier is provided with a pair of brackets 141 (Fig. 6) which project into the path of movement of the arms 146 and are engaged by such arms when the barrier reaches the fully projected position.

As is also described in the aforesaid Patent 2,327,366, the control system for the barrier is preferably such that upon the approach to the associated intersection of a train, each ram is gradually supplied with elastic fluid. The proportions of the ram are preferably such that under normal conditions, a relatively low pressure in each ram of the order, for example, of about ten pounds per square inch, is sufficient to cause the associated barrier to start and move upwardly at a gradual speed. The control system is further such that when each barrier reaches an intermediate or warning height which height may be and preferably is approximately 40% of the fully projected height of the barrier, the supply of pressure is cut off for a predetermined interval and is then again turned on, so as to cause the barrier to resume its upward movement. When each barrier reaches its fully elevated position, it is stopped by the shock absorbers 140, as mentioned above.

The source of pressure for the rams is preferably arranged to provide a pressure substantially in excess of the pressure normally required to elevate each barrier. For example, assuming that the proportioning of the parts is such that a pressure of ten pounds per square inch is normally sufficient to elevate the barriers, it is preferred to have available a pressure of about 125 pounds per square inch. This relatively high pressure serves a variety of important purposes.

It will be appreciated that the barriers may frequently start their upward movements at a time when approaching vehicles are too close thereto to enable a full stop before reaching the barrier for the corresponding line. Under such circumstances, it is to be expected that such vehicles will pass over the barriers. Under the conditions stated, it is preferred that the vehicles be able to depress the barriers relatively readily. The previously mentioned normal elevating pressure is just sufficient to provide a gradual lifting movement, and it will be appreciated, therefore, that a vehicle in passing over the barrier can quickly depress the same to the retracted position. The just-mentioned depressing movement which may occur at any stage of the lifting movement, does not alter the position of the valves associated with each ram and consequently serves to increase the pressure in each ram. As a consequence, as soon as the vehicle in question passes beyond the barrier, the thus increased pressure becomes effective to re-elevate the barrier to the position occupied by it immediately before the impact of the vehicle, the rate of such rising movement being held to a safe value by the shock absorbers 140.

It may occur from time to time that a vehicle will occupy the space between the barriers at respectively opposite sides of an intersection at a time when the barriers are elevated, and the control system is so arranged as to automatically lower the corresponding off-going barriers for a predetermined interval, under these conditions. To take care of those instances in which the thus trapped vehicle may fail to clear the intersection during the just-mentioned interval it is preferred to cut off the pressure for the off-going barriers when they reach the fully elevated position, so that such barriers may be readily depressed at all times by vehicles aproaching the same from the rear. It is preferred, however, to positively but resiliently hold the approach barriers in the fully elevated positions. This feature is readily afforded by the present elastic fluid operated rams, since when the approach barriers reach the fully elevated positions, the pressure is maintained thereon and is allowed to build up to a higher or locking value of, for example, 30 pounds per square inch, which pressure is found adequate for practical purposes.

It may also frequently occur that an abnormal force is required to elevate a barrier. For example, during the winter months, ice may form around the joint between each barrier and its casing or a heavy layer of ice may be deposited on top of each barrier and on top of the adjacent road surface. Also, it may happen that at the time a ram is initially actuated, a heavy object, such as a truck, will have its wheels resting upon a barrier. In any of these events, the previously described relatively low elevating pressure is insufficient to elevate the corresponding barrier. With the present elastic actuating fluid, however, the pressure continues to build up in each ram and finally reaches a value sufficient to "break loose" the obstructed barrier. As previously mentioned it is preferred to have available a pressure of approximately 125 pounds per square inch and this pressure is found adequate to relatively quickly break loose an obstructed barrier under the most severe operating conditions.

As soon as the obstructed barrier is broken loose, the pressure built up in the associated ram tends to cause the barrier to rapidly rise. However, because of the relatively large diameter of the ram, a relatively small upward movement of the ram is again effective to dissipate such relatively high pressure and bring the pressure acting against the piston to a value only sufficient to cause a safe rate of rise of the barrier. Also, under these conditions, the previously mentioned snubbers act to limit the rate of rise of the barrier to a safe value.

The just mentioned additional force commensurate with that required to effect the desired elevating movement of the barriers is, as will be appreciated, available at any stage of the barrier movement.

It will be appreciated that it is advisable to from time to time inspect the barriers. Such inspection and any necessary repairs are readily possible with the present construction, which enables each individual barrier to be lifted beyond the normal range of its elevating movement to the pull-away or service position, shown in Fig. 5. It will be noticed that the only operations which must be performed in order to release each barrier from its associated casing are to disconnect the auxiliary hinges 64, to disconnect the ram 110, and to disconnect the shock absorbers 140. The disconnection of the auxiliary hinges 64 is readily performed by loosening the associated holding studs 78, which are accessible from the exterior of the barrier, as clearly appears in Fig. 2. The release of the ram is readily effected by disconnecting the piston rod 116 from its associated clevis 117. For this purpose, the releasable connection of Fig. 8 may be and preferably is employed. This connection comprises a relatively light pin 119, which is passed transversely through the pivot pin 118. A spring clip 121 bears upon one end of the pin 119, and holds the other end under a pad 115, thereby holding the pin 119 in place and preventing withdrawal of the pivot pin 118 in either direction from the clevis 117. By relieving the pressure of the clip 121, however, the pin 119 may be withdrawn, thereby permitting the pivot pin 118 to be withdrawn. Similar connections may be employed in connection with the clevises 150, associated with the shock absorber arms 148. As previously mentioned, the lighting units 92 can be swung to the positions shown in dotted lines in Fig. 7, thereby affording access to the interior of the associated barrier for the purpose of releasing the shock absorber connections. In addition, a removable plate 113, held in place by studs 111 (Figs. 4 and 11), is provided at an intermediate point along the length of each barrier, which upon removal, affords access to the interior of the barrier for the purpose of releasing the ram connection.

By virtue of the just-mentioned pull-away movement, full access, both to the interior of each barrier and to the interior of the associated casing, is afforded, thus eliminating any otherwise existing necessity of providing relatively deep pits or casings and of providing doors or traps through which the same may be entered.

Although only several specific embodiments of the invention have been described in detail, it will be appreciated that various modifications in the form, number and arrangement of parts may be made within the spirit and scope of the present invention.

What is claimed is:

1. In a barrier construction, the combination of a barrier member, a supporting member for said barrier member, means for hingedly connecting said barrier member to said supporting member for movement about a horizontal axis from a retracted position in which the barrier member is embedded in an associated roadway to a projected position in the path of vehicles traversing said roadway, said hinging means comprising at least one hinge pin connected to one of the members and a complementary openly concave element carried by the other member to freely receive the pin, and releasable auxiliary hinge means for limiting separating movements between said pin and element, said auxiliary means being inaccessible from the exterior of said barrier when the latter is in its retracted position.

2. In a protective system, the combination of a barrier, a casing for said barrier embedded in an associated roadway, means hingedly connecting said barrier to the casing for movement between a retracted position within the said casing to a projected position in the path of approaching vehicles, motive means for moving said barrier between said positions, means connecting said motive means between said barrier and said casing, said barrier being movable upon release of said connecting means to an elevated position beyond said projected position for servicing purposes, and removable means accessible only when said barrier is projected for releasing said connecting means.

3. In a protective system, the combination of a barrier, a casing for said barrier embedded in an associated roadway, said barrier having a surface which forms a continuation of the road surface when the barrier is retracted, and having a barrier face received in said casing when the barrier is retracted, means hingedly connecting said barrier to said casing for pivotal movement about a substantially horizontal axis extending transversely of the roadway so as to swing said barrier from the retracted position to a projected position in which the said face is exposed above the roadway, control means connected between the barrier and the casing for controlling the position of the barrier, a lighting unit carried by and movable with said barrier, said lighting unit being positioned within said barrier and said barrier face having an opening through which a beam of light from said unit may be projected, said lighting unit being swingably mounted for movement from an active position adjacent said opening to a retracted position, certain of said connections for said control means being accessible through said opening when said lighting unit is swung to its retracted position.

4. In a protective system, the combination of a movable barrier having a surface which forms a continuation of the road surface when the barrier is retracted, and having a barrier face which is exposed above the roadway when the barrier is projected, and a lighting unit carried by and movable with said barrier, said lighting unit being positioned within said barrier and said barrier face having an opening through which a beam of light from said unit may be projected, said lighting unit being swingably mounted for movement from an active position adjacent said opening to a retracted position.

5. In a protective system, the combination of a barrier, a casing for said barrier embedded in an associated roadway, said barrier having a surface which forms a continuation of the road surface when the barrier is retracted and having a barrier face received in said casing when the barrier is retracted, said casing comprising a pair of structural members laterally spaced from each other and extending generally parallel to the length of the barrier, means comprising flexible sealing means for sealing the joint between said barrier and said casing when the barrier is retracted, means hingedly connecting said barrier to said casing for pivotal movement about a substantially horizontal axis so as to swing said barrier from the retracted position to a projected position in which the said face is exposed above the roadway, said hinging means including at least one hinge pin element and a complementary openly concave element, one of said elements being carried by the barrier and the other element being carried by one of said structural members, the other said structural member being disposed for engagement by the barrier when the latter is retracted so as to form a limit to such retracted movement, means including motive means for moving the barrier from the retracted toward the projected position and for controlling the rate of such movement, said motive means being connected between the barrier and the casing by elements at least certain whereof are disconnectible, a lighting unit carried by and movable with said barrier, said lighting unit being positioned within said barrier and said barrier face having an opening through which a beam of light from said unit may be projected, said lighting unit being swingably mounted for movement from an active position adjacent said opening to a retracted position, certain of said disconnectible elements being accessible through said opening when said lighting unit is swung to its retracted position, and said barrier being movable upon release of its connections to the casing to an elevated position beyond said retracted position for servicing purposes during which movement said hinging elements are separated from each other.

6. In a protective system, the combination of a barrier, a casing for said barrier embedded in an associated roadway, means hingedly connecting said barrier to the casing for movement between a retracted position within the said casing to a projected position in the path of approaching vehicles, motive means for moving said barrier between said positions, means connecting said motive means between said barrier and said casing, said barrier being movable upon release of said connecting means to an elevated position beyond said projected position for servicing purposes, said hinging means comprising at least one hinge pin element and a complementary openly concave element, one of said elements being carried by the barrier and the other said element being carried by the casing, said elements being separated from each other during movement of the barrier to the said elevated position, and means for releasing said connecting means which are inaccessible when said barrier is in its retracted position.

7. In a protective system, the combination of a barrier, a casing for said barrier embedded in an associated roadway, means hingedly connecting said barrier to the casing for movement between a retracted position within the said casing to a projected position in the path of approaching vehicles, motive means for moving said barrier between said positions, means connecting said motive means between said barrier and said casing, said barrier being movable upon release of said connecting means to an elevated position beyond said projected position for servicing purposes, said hinging means including elements carried respectively by the barrier and the casing and which are separable from each other during movement of the barrier to the elevated position, said elements being in pivotal engagement with each other during normal movement of the barrier between the projected and retracted positions, and means for releasing said connecting means which are inaccessible when said barrier is in its retracted position.

8. In a protective system, the combination of a barrier, a casing for said barrier embedded in an associated roadway, means hingedly connecting said barrier to the casing for movement between a retracted position within the said casing to a projected position in the path of approaching vehicles, motive means for moving said barrier between said positions and connected between said barrier and said casing, said barrier being movable upon release of said connections to an elevated position beyond said projected position for servicing purposes, said hinging means including elements carried respectively by the barrier and the casing and which are separable from each other during movement of the barrier to the elevated position, said elements being in pivotal engagement with each other during normal movement of the barrier between the projected and retracted positions, auxiliary hinging means loosely connected between the barrier and the casing, said first mentioned hinging means serving to transmit impact forces between said members, and said auxiliary hinging means acting to normally prevent movement of said barrier to the elevated position, said auxiliary hinging means being disconnectible to accommodate said last mentioned movement, and being inaccessible when said barrier is in its retracted position.

9. In a protective system, the combination of a movable barrier having a surface which forms a continuation of the road surface when the barrier is retracted, and having a barrier face which is exposed above the roadway when the barrier is projected, and a lighting unit carried by and movable with said barrier, said lighting unit being positioned within said barrier and said barrier face having an opening through which a beam of light from said unit may be projected, said lighting unit being movably mounted for movement from an active position adjacent said opening to a retracted position in which access may be had through said opening to the interior of said casing.

10. In a protective system, the combination of a movable barrier having a surface which forms a continuation of the road surface when the barrier is retracted, and having a barrier face which is exposed above the roadway when the barrier is projected, a lighting unit carried by and movable with said barrier, said lighting unit being positioned within said barrier and said barrier face having an opening through which a beam of light from said unit may be projected, said lighting unit being movably mounted for movement from an active position adjacent said opening to a retracted position in which access may be had through said opening to the interior of said casing, and means for moving and for controlling the movement of the barrier between the projected and retracted positions, said means including disconnectible elements accessible through said opening.

SULO M. NAMPA.